May 27, 1969  K. R. SKINNER ETAL  3,447,131
DUAL PURPOSE FLASHER AND MOTOR VEHICLE SIGNALING
SYSTEM INCORPORATING SAME
Filed Dec. 17, 1965

INVENTORS
Kenneth R. Skinner &
BY David P. Clayton

Albert F. Duke
ATTORNEY

United States Patent Office 3,447,131
Patented May 27, 1969

3,447,131
DUAL PURPOSE FLASHER AND MOTOR VEHICLE SIGNALING SYSTEM INCORPORATING SAME
Kenneth R. Skinner and David P. Clayton, Anderson, Ind., assignors to General Motors Corporation, Detroit, Mich., a corporation of Delaware
Filed Dec. 17, 1965, Ser. No. 514,552
Int. Cl. B60q 1/52
U.S. Cl. 340—80    8 Claims

ABSTRACT OF THE DISCLOSURE

A dual purpose flasher exhibiting the characteristics of both a series and shunt type flasher is disclosed and incorporated in a signal system including a turn signal switch adapted to place the flasher in its series mode of operation for selectively flashing one of two pair of lamps and an emergency warning switch adapted to place the flasher in its shunt mode of operation for simultaneously flashing both pairs of signal lamps.

---

This invention relates to motor vehicle signal systems and more particularly to a signal system including a dual purpose thermomotive flasher operable in a series mode for turn signal indication and a shunt mode for emergency warning indication.

Present automobiles are equipped with front and rear signal lamps located at the left and right sides of the automobile. A turn signal switch operable by the driver is adapted to selectively connect either the left or right signal lamp to a periodic circuit interrupter generally referred to as a flasher. The thermomotive flasher is the most widely used flasher in present automobiles. Thermomotive flashers are generally designated as either the series or current operated type or the shunt or voltage operated type.

In the series type flasher, a low resistance operating element is directly heated by current flow through normally closed contacts, an operating element and the lamp load. The lamps are immediately energized but after a time interval, the heated operating element opens the normally closed contacts to interrupt the circuit. Thereafter, the element cools and again opens the circuit. This type of flasher is quite useful in the turn signal operation wherein a fixed number of lamps is connected to the flasher regardless of whether a left or right turn is indicated. The operating element can then be designed to operate on a substantially constant load current and burnout of one of the lamps will lower the load current to a value insufficient to cause switching action of the element thus constantly energizing a suitably located indicator lamp and informing the driver of lamp burnout. This arrangement, however, prevents utilization of a conventional series-type flasher for both turn signaling and emergency warning since in the latter case it is desirable to flash both the right and left signal lamps. Because of the 100 percent increase in load current during the emergency warning mode of operation a single conventional series-type flasher has not been suitable for both turn signal and emergency modes of operation.

On the other hand, the conventional shunt-type flasher utilizes a high resistance operating element connected in parallel with normally open load circuit controlling contacts. Thus load current through the operating element and the lamps is initially insufficient to illuminate the lamps. When the operating element is heated a fixed amount, it affects closure of the normally open contacts shunting the operating element and illuminating the signal lamps. The shunt-type flasher is substantially independent of load variations and thus it would appear that a single shunt-type flasher could be effective for both modes of operation. This load insensitive feature, however, prevents a simple arrangement for burnout indication.

Consequently, the prior art systems including both modes of operation have generally utilized two separate flashers or a series-type flasher with means for compensating for the increased load current.

In accordance with the present invention, a single dual purpose flasher exhibiting the characteristics of both the series and shunt-type prior art type flashers is provided in a signal system including switching means connected with the flasher to provide both turn signal and emergency warning loads of operation without sacrificing the advantages associated with either type flasher. More specifically, the flasher includes a heat expansible element secured to a snap action element and in its contracted state maintaining the snap acting element in a position to close a pair of contacts, one of which is secured to the heat expansible element. A heater element is positioned in heat transfer relationship with the expansible element and is adapted when connected to a source of voltage to heat the heat expansible element allowing the snap action element to close normally open contacts, one of which is attached to the snap action element. First and second electrically insulated input terminals are connected respectively to the other of the normally closed contacts and the heater element respectively. The other of the normally open contacts is connected in shunt with the heater element. A turn signal switch is adapted to connect either the left or right signal lamps to the output of the flasher with the source of voltage connected to the first input terminal of the flasher. An emergency warning switch is provided for disconnecitng the first input to the flasher from the source of voltage and connecting the source to the second input terminal and connecting the output terminal of the flasher to both the left and right signal lamps.

A more complete understanding of the present invention may be had from the following detailed description which should be read in conjunction with the drawings in which.

Figure 1:
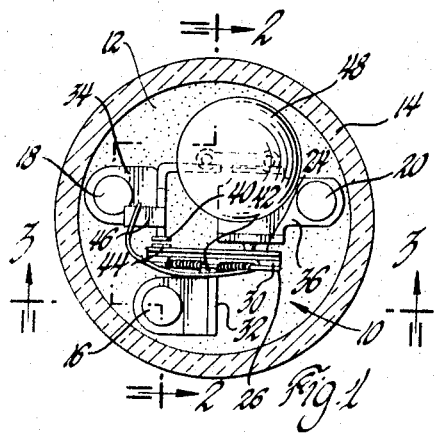
FIGURE 1 is a plan view of the dual purpose flasher.
Figure 2:
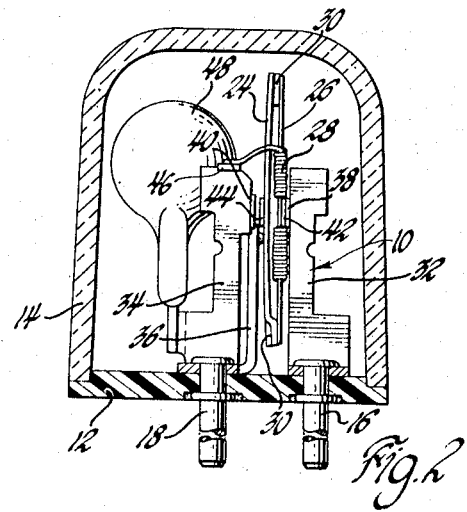
FIGURE 2 is a sectional view taken along lines 2—2 of FIGURE 1.
Figure 3:
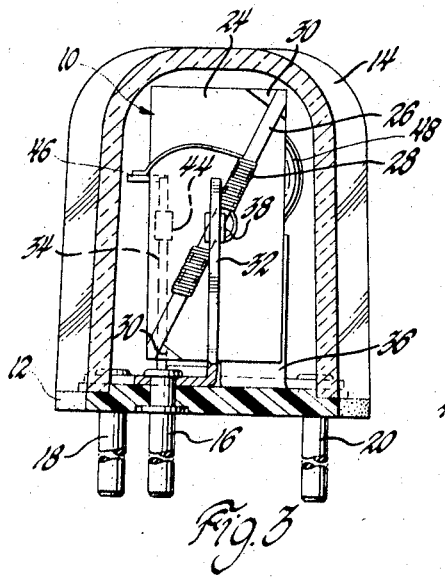
FIGURE 3 is a sectional view taken along lines 3—3 of FIGURE 1.

Referring now to the drawings and initially to FIGURES 1–3, the flasher operating elements generally designated 10 are supported by an insulating base 12 and enclosed within a cover 14 permanently attached to the base 12. Input terminals 16 and 18 and an output terminal 20 extend through the base for connection with certain of the operating elements 10.

The operating elements 10 include a snap action metal vane 24 which is attached to a pull ribbon 26 of electrically conductive thermally expansible metal. An electrically insulated heating element 28 is wound about the ribbon 26 preferably with half of the turns on opposite sides of the center of the ribbon 26 to produce uniform heating. Opposite ends of the pull ribbon 26 are attached to bent out diagonal corners 30 of the vane 24. The pull ribbon is secured to the vane 24 while in a cold contracted condition and maintains the vane 24 in a deformed position so that energy is stored in the vane whereby the vane tends to snap back to a restored position as soon as the tension holding it in a deformed position is released by expansion of the ribbon 26. Conductive spring members 32, 34 and 36 are brazed, soldered or otherwise electrically connected to input terminals 16 and 18 and output terminal 20 respectively. The conductive members 32 and 34 carry contacts 38 and 40 respectively while the conductive member 36 is spot welded or brazed to and provides a support for the metal vane 24. The ribbon 26 carries a movable contact 42 which normally is in engagement with the relatively fixed contact 38, while the metal vane 24 carries a movable contact 44 adapted to engage the relatively fixed contact 40 when the vane 24 snaps to its restored position. Opposite ends of the heating element 28 are welded to the ribbon 26 and a projection 46 of the conductive member 34. An incandescent lamp 48 is supported by the base 12 with its filament connected between the conductive members 34 and 36.

Figure 4:
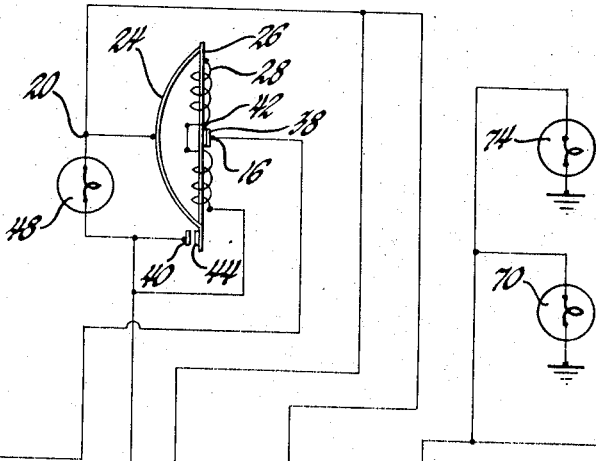
FIGURE 4 is a schematic diagram of a signaling system utilizing the flasher.
Figure 4:
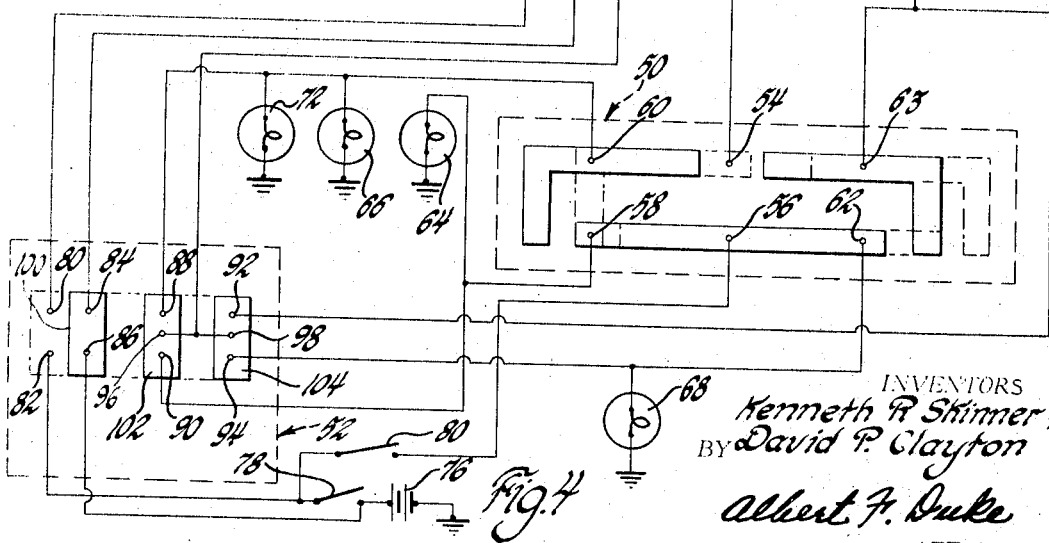

Referring now to FIGURE 4, the flasher elements 10 are shown connected in a signaling circuit which includes a turn signal switch generally designated 50 and an emergency warning switch generally designated 52. The turn signal switch 50 includes input terminals 54 and 56 and output terminals 58–63. The terminals 58–60 are connected to the left rear and front signal lamps 64 and 66 respectively. The terminals 62 and 63 are connected to the right rear and right front signal lamps 68 and 70 respectively. Turn indicator lamps 72 and 74 are connected to the terminals 60 and 63 respectively. The input terminal 54 is connected to the output terminal 20 of the flasher 10 while the input terminal 56 is connected to a source of voltage such as the vehicle battery 76 through an ignition switch 78 and a brake switch 80. The emergency warning switch 52 comprises stationary contacts 80–98 and movable contacts 100–104. As shown in the schematic, the normal off position of the emergency warning switch 52 is shown in dotted line while the full line position indicates the on position. In the off position, the emergency warning switch 52 connects the battery 76 to the first input terminal 16 of the flasher 10. When the emergency warning switch 52 is in the on position, the battery 76 is connected directly to the second input terminal 18 of the flasher 10 through the movable contact 100 and stationary contacts 84, 86. Also the signal lamps 64–70 and the indicator lamps 72, 74 are connected to the output terminal 20 of the flasher 10 through the movable contacts 102, 104 and the stationary contacts 88–98.

The operation is as follows. With the emergency warning switch 52 in the off position and the turn signal switch 50 in the neutral position, closure of the brake switch 80 will illuminate the rear signal lamps 64 and 68. Actuation of the turn signal switch 50 to a left turn indicating position as shown in the dotted lines, will connect the input terminal 54 to the output terminals 58 and 60 thereby initiating current flow through the normally closed contacts 38 and 42, the ribbon 26, the metal vane 24, and the left front and rear signal lamps 66 and 64 and indicator lamp 72. The lamps are immediately energized and after a time interval allowing the ribbon 26 to heat up, the metal vane 24 is snapped to its restored position opening the contacts 38 and 42 and extinguishing the lamps. The ribbon 26 will then cool and close the contacts 38 and 42 again energizing the lamps. The lamps 64, 66 and 72 thus are intermittently energized. Burnout of either the signal lamps 64 or 66 will lower the current flow through the ribbon 26 to a value insufficient to cause snap action of the vane 24 and thus the turn indicator lamp will not flash indicating to the driver that one of the left signal lamps has burned out.

Actuation of the emergency warning switch 52 to the on position establishes a series circuit from the battery 76 through the heating element 28, the metal vane 24, the movable contacts 102, 104 and the lamps 64–74. Initially, the voltage drop across the heating element 28 is sufficient to prevent energization of the signal lamps 64–74 and insure energization of the emergency indicator lamp 48. After a predetermined interval, the heat generated from the heating element 28 is sufficient to cause expansion of the ribbon 26 allowing the metal vane 24 to snap to its restored position closing the contacts 40 and 44 thereby shunting the heating element 28 and connecting the lamps 64–74 directly to the battery 76 through the input terminal 18, the contacts 40, 44, the metal vane 24 and the output terminal 20. The emergency warning indicator 48 is also shunted and is extinguished. As the heating element 28 cools, the ribbon 26 contracts and snaps the metal vane to its deformed position opening the contacts 40 and 44 and thus extinguishing the lamps 64–74 but energizing the lamp 48.

We claim:
1. A flasher comprising an insulating base,
a snap action element supported from said base,
a heat expansible element secured to said snap action element and in its contracted state maintaining said snap action element in a first position,
said snap action element snapping to a second position upon preset expansion of said expansible element,
first contact means mounted to said heat expansible element,
second contact means supported by said base,
said first and second contacts being closed in said one position of said snap action element and opened in said second position of said snap action element,
first and second input terminals and an output terminal carried by said base,
said first input terminal being electrically connected to said second contact,
a heater element electrically connected between said output terminal and said second input terminal and in heat transfer relation to said expansible element,
third contact means supported by said base and electrically connected to said second input terminal,
fourth contact means mounted to said snap action element and electrically connected to said output terminal,
said third and fourth contact means being open when said snap action element is in said one position and closed when said snap action element is in said second position.

2. The flasher as claimed in claim 1 including an incandescent lamp supported by said base and electrically connected between said second input terminal and said output terminal.

3. The flasher as claimed in claim 1 wherein said heater element is wound around said expansible element.

4. The flasher as claimed in claim 1 wherein said first contact means is mounted substantially intermediate the ends of said heat expansible element and approximately one half of said heater element is wound on each side of said first contact means.

5. A signaling system for a motor vehicle provided with two pairs of lamps,
said system comprising a source of voltage,
a thermal switching element,
normally closed contact means connected in series with said thermal switching element,
a heater element positioned in heat transfer relationship with said thermal switching element,
normally opened contact means connected in parallel with said heater element,
normally opened turn signal switch means for connecting said thermal element in series with one pair of said signal lamps,
emergency warning switch means normally connecting said source to said normally closed contact means and actuable to disconnect same and connect the input and output junctions of said normally opened contact means and said heater element in series between said source and both pairs of said signal lamps,
said thermal element being movable from a first position to a second position in response to application of thermal energy to simultaneously open said normally closed contact means and close said normally opened contact means.

6. The system defined in claim 5 further including an incandescent lamp connected in parallel with said heater element.

7. A motor vehicle signaling system comprising a source of voltage, first and second pairs of signal lamps, a flasher comprising an insulating base, a snap action element supported from said base, a heat expansible element secured to said snap action element and in its contracted state maintaining said snap action element in a first position, said snap action element snapping to a second position upon preset expansion of said expansible element, first contact means mounted to said heat expansible element, second contact means supported by said base, said first and second contact means being closed in said one position of said snap action element and opened in said second position of said snap action element, first and second input terminals and an output terminal carried by said base, said first input terminal being electrically connected to said second contact means, a heater element electrically connected between said output terminal and said second input terminal and in heat transfer relation to said expansible element, third contact means supported by said base and electrically connected to said second input terminal, fourth contact means mounted to said snap action element and electrically connected to said output terminal, said third and fourth contact means being open when said snap action element is in said one position and closed when said snap action element is in said second position, a turn signal switch comprising a switch input terminal and contact means selectively movable from a neutral position to first and second operating positions to connect either said first or said second pairs of lamps to said switch input terminal, said switch input terminal being connected to the output terminal of said flasher, and an emergency warning switch operable independently of said turn signal switch and including movable contact means normally connecting said source to said first input terminal of said flasher and movable to an operating position connecting said source to said second input terminal and said first and second pairs of signal lamps to said output terminal of said flasher.

8. A motor vehicle signaling system comprising, a source of voltage, two pairs of lamps, flasher means including first and second input terminals and an output terminal, a metal vane, a thermomotive element secured to said vane, means connecting said metal vane to said output terminal, means normally connecting said thermomotive element to said first input terminal whereby current flow between said first input terminal and said output terminal directly heats said element, a heater element connected between said second input terminal and said output terminal for indirectly heating said thermomotive element, said metal vane being movable in response to heating of said thermomotive element to disconnect said thermomotive element from said first input terminal and provide an electrical current path between said output terminal and said second input terminal in parallel with said heater element, switching means for selectively connecting either or both of said pairs of signal lamps to the output terminal of said flasher while simultaneously connecting said source to said first or second input terminals respectively.

References Cited

UNITED STATES PATENTS

| | | | |
|---|---|---|---|
| 3,196,311 | 7/1965 | Bleiweiss et al. | 340—81 X |
| 3,328,636 | 6/1967 | Siiberg | 340—81 X |
| 3,349,280 | 10/1967 | Siiberg | 340—79 X |

JOHN W. CALDWELL, *Primary Examiner.*

KENNETH N. LEIMER, *Assistant Examiner.*

U.S. Cl. X.R.

337—138; 340—67, 81, 251